United States Patent
Aoki et al.

(10) Patent No.: US 9,335,710 B2
(45) Date of Patent: May 10, 2016

(54) ELECTRIC POWER SUPPLY CONTROL DEVICE WHICH CAN INCREASE POWER CONVERTING EFFICIENCY

(71) Applicant: KONICA MINOLTA, INC., Chiyoda-ku, Tokyo (JP)

(72) Inventors: Mikiyuki Aoki, Toyohashi (JP); Taku Kimura, Toyokawa (JP); Yohei Yamada, Hino (JP); Morio Kinoshita, Toyokawa (JP); Toru Kasamatsu, Toyokawa (JP); Kouei Cho, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/855,219

(22) Filed: Sep. 15, 2015

(65) Prior Publication Data

US 2016/0085199 A1    Mar. 24, 2016

(30) Foreign Application Priority Data

Sep. 18, 2014   (JP) .................................. 2014-189899

(51) Int. Cl.
*G03G 15/00* (2006.01)
*H02M 3/24* (2006.01)

(52) U.S. Cl.
CPC ................. *G03G 15/80* (2013.01); *H02M 3/24* (2013.01); *Y02B 70/16* (2013.01)

(58) Field of Classification Search
CPC .......... G03G 15/80; H02M 3/24; Y02B 70/16
See application file for complete search history.

(56) References Cited

U.S. PATENT DOCUMENTS

| | | | | |
|---|---|---|---|---|
| 5,258,901 A | * | 11/1993 | Fraidlin | H02J 9/061 307/64 |
| 5,939,802 A | * | 8/1999 | Hornbeck | H02J 1/10 307/64 |
| 6,288,914 B1 | * | 9/2001 | Sato | H02M 3/33523 363/18 |
| 2003/0107356 A1 | * | 6/2003 | Hachiya | H02M 3/156 323/282 |
| 2004/0141339 A1 | * | 7/2004 | Kotsuji | H02M 1/4225 363/21.04 |
| 2005/0094341 A1 | * | 5/2005 | Hachiya | H02M 3/156 361/93.1 |
| 2010/0091531 A1 | | 4/2010 | Lum | |
| 2013/0106186 A1 | | 5/2013 | Kishimoto | |
| 2015/0256079 A1 | * | 9/2015 | Kimura | G03G 15/80 363/15 |

FOREIGN PATENT DOCUMENTS

JP    2012505631 A    3/2012
JP    2013099013 A    5/2013

* cited by examiner

*Primary Examiner* — G. M. Hyder
(74) *Attorney, Agent, or Firm* — Holtz, Holtz & Volek PC

(57) ABSTRACT

An electric power supply control device comprises a first converter, at least one second converter, and an electrical voltage control unit. The second converter can work in intermittent oscillation, and converts outputting electrical voltage from the first converter. The electrical voltage control unit controls the outputting electrical voltage of the first converter, so that the outputting electrical voltage is equal to or less than a minimum value of upper limits of operating electrical voltage of the second converter, and is more than or equal to a maximum value of lower limits of operating electrical voltage of the second converter, and at least one of the second converter performs low electric power behavior.

18 Claims, 13 Drawing Sheets

ELECTRIC POWER SUPPLY CONTROL DEVICE WHICH CAN INCREASE POWER CONVERTING EFFICIENCY

This application is based on Japanese Patent Application No. 2014-189899 filed with the Japan Patent Office on Sep. 18, 2014, the entire content of which is hereby incorporated by reference.

BACKGROUND OF THE INVENTION

1. Field of the Invention

This invention relates to an electric power supply control device, an image forming apparatus, a control method of an electric power supply control device, and a control program for an electric power supply control device. In particular, this invention relates to an electric power supply control device, an image forming apparatus, a control method of an electric power supply control device, and a control program for an electric power supply control device which include a DC/DC converter for performing intermittent oscillation.

2. Description of the Related Art

An electric power supply control device is used for electronic devices, such as an image forming apparatus (an MFP (Multi Function Peripheral) having a scanner function, a facsimile function, a copying function, a function of a printer, a data transmitting function and a server function, a facsimile device, a copying machine, a printer, or the like). An electric power supply control device may have a DC/DC converter which performs intermittent oscillation.

Traditionally, there are methods as below for improving efficiency of a DC/DC converter in an electric power supply control device. More specifically, outputting electrical voltage of a low voltage electric power supply is reduced, monitoring electrical voltage at a connection part between the low voltage electric power supply and the DC/DC converter.

Document 1 below discloses a DC/DC converter which can improve the efficiency by an electric power controlling method in which outputting electrical voltage of a low voltage electric power supply is reduced, monitoring electrical voltage at a part where the DC/DC converter is connected with the low voltage electric power supply.

Document 2 below discloses an electronic device which measures an electrical current at a part where the DC/DC converter is connected with the low voltage electric power supply. The electrical voltage between a maximum and a minimum of an allowable input electrical voltage range of the DC/DC converter load is output, so that the measured electrical current is at the lowest level.

Document 1: Japanese Translation of PCT International Application Publication No. 2012-505631

Document 2: Japan Patent Publication No. 2013-99013

During sleeping of the electronic device, a predetermined amount of electrical voltage (for example, 5V) is output from the low voltage electric power supply to the electric power supply control device, similarly as the normal condition. At this time, lower electrical voltage (electrical voltage which is equal to or less than 5V) is made by the DC/DC converter and used in the electric power supply control device. There is a limit on improving further efficiency with outputting 5V for the electric power supply circuit. The effect of reducing switching loss has a much greater impact on improving efficiency of the DC/DC converter. Hence, it is desired for improving the efficiency of the DC/DC converter that intermittent oscillation is maintained and the number of times of switchings is reduced when the load is light.

According to the electric power managing method disclosed in above Document 1, there is a limit on improving efficiency. More specifically, the input electrical voltage is decreased as long as the output is maintained. Hence, a DC/DC converter having an intermittent oscillation behavior function may not be able to perform intermittent oscillation.

According to the electronic device disclosed in Document 2, a structure of the equipment is complicated. More specifically, the device should measure the input electrical currents by varying the input electrical voltage of the DC/DC converter, determine the electrical voltage where the measured electrical current is a minimum, and store the same.

This invention is to solve the problems. The object is providing an electric power supply control device, an image forming apparatus, a control method of an electric power supply control device, and a control program for an electric power supply control device which can increase power converting efficiency.

SUMMARY OF THE INVENTION

To achieve the above object, according to one aspect of the invention, an electric power supply control device comprising: a first converter for performing converting behavior to convert input electrical current and output direct electric current; at least one second converter being connected with the first converter in series, which can work in intermittent oscillation method, and performs converting behavior to output direct electric current voltage by converting outputting electrical voltage being output from the first converter; and an electrical voltage control unit for controlling the outputting electrical voltage being output from the first converter; wherein the second converter is configured to perform low electric power behavior under certain circumstances, in which a switching frequency of oscillation being performed is lower than other circumstances or intermittent oscillation is performed; and the electrical voltage control unit controls the outputting electrical voltage, so that the outputting electrical voltage is equal to or less than a minimum value of upper limits of operating electrical voltage of the second converter, and is more than or equal to a maximum value of lower limits of operating electrical voltage of the second converter, and at least one of the second converter performs the low electric power behavior in response to a behavior state of the second converter.

According to another aspect of this invention, an image forming apparatus comprising: the above electric power supply control device; wherein the second converter of the electric power supply control device provides electric power to the image forming apparatus, and the image forming apparatus works.

According to another aspect of this invention, a method of controlling an electric power supply control device, wherein the electric power supply control device comprising: a first converter for performing converting behavior to convert input electrical current and output direct electric current; and at least one second converter being connected with the first converter in series, which can work in intermittent oscillation method, and performs converting behavior to output direct electric current voltage by converting outputting electrical voltage being output from the first converter; wherein the second converter is configured to perform low electric power behavior under certain circumstances, in which a switching frequency of oscillation being performed is lower than other circumstances or intermittent oscillation is performed; wherein the method of controlling an electric power supply control device is configured to: acquire information which relates to a behavior state of the second converter; and control the outputting electrical voltage being output from the first converter, so that at least one of the second converter performs the low electric power behavior, in response to the acquired information; wherein the outputting electrical voltage is controlled, so that the outputting electrical voltage is equal to or less than a minimum value of upper limits of operating electrical voltage of the second converter, and is more than or equal to a maximum value of lower limits of operating electrical voltage of the second converter.

According to another aspect of this invention, a non-transitory computer-readable recording medium storing a controlling program for an electric power supply control device, wherein the electric power supply control device comprising: a first converter for performing converting behavior to convert input electrical current and output direct electric current; and at least one second converter being connected with the first converter in series, which can work in intermittent oscillation method, and performs converting behavior to output direct electric current voltage by converting outputting electrical voltage being output from the first converter; wherein the second converter is configured to perform low electric power behavior under certain circumstances, in which a switching frequency of oscillation being performed is lower than other circumstances or intermittent oscillation is performed; wherein the program causing a computer to execute the steps of: acquire information which relates to a behavior state of the second converter; and control the outputting electrical voltage being output from the first converter, so that at least one of the second converter performs the low electric power behavior, in response to the acquired information; wherein the outputting electrical voltage is controlled, so that the outputting electrical voltage is equal to or less than a minimum value of upper limits of operating electrical voltage of the second converter, and is more than or equal to a maximum value of lower limits of operating electrical voltage of the second converter.

DESCRIPTION OF THE PREFERRED EMBODIMENTS

An image forming apparatus according to one embodiment of this invention will be explained in the followings.

The image forming apparatus has a print function, a server function, and so on. By the print function, sheets are conveyed by rollers, and printing (print) is performed on the sheets using electrophotographic technology. By the server function, document data or the like is stored in a HDD (Hard Disk Drive) or the like. The image forming apparatus has an electric power supply control device, and performs various sorts of functions by using direct current electrical voltage generated from alternating current electric power supply by the electric power supply control device.

Embodiments

An entire structure of an image forming apparatus according to the embodiment will be explained.

[The Entire Structure of an Image Forming Apparatus]

Figure 1:
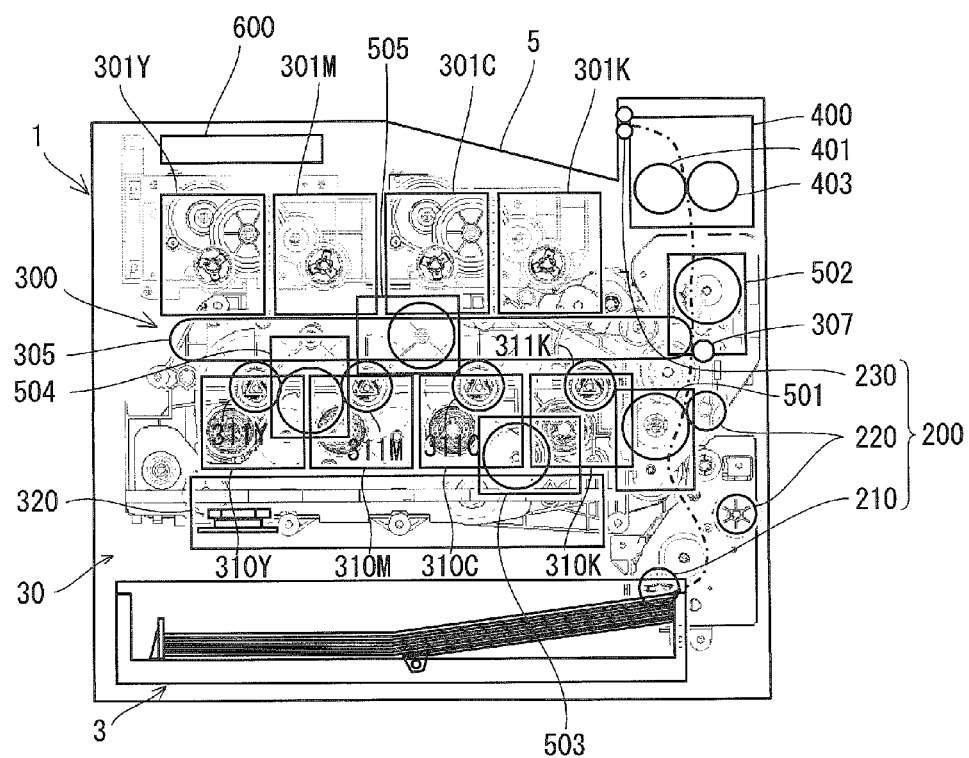
FIG. 1 is a side view showing a hardware configuration of an image forming apparatus according to one embodiment of this invention.

FIG. 1 is a side view showing a hardware configuration of an image forming apparatus according to one embodiment of this invention.

Referring to FIG. 1, image forming apparatus 1 has paper feeding cartridge 3, copy receiving tray 5, print unit 30, and electric power supply device (an example of an electric power supply control device) 600.

Paper feeding cartridge 3 is placed at the lower part of image forming apparatus 1, being able to be connected and disconnected to a chassis of image forming apparatus 1. Sheets loaded on paper feeding cartridge 3 are fed from paper feeding cartridge 3 to print unit 30 one by one, when printing. The number of paper feeding cartridge 3 is not limited to one. More than 1 paper feeding cartridges may be installed.

Copy receiving tray 5 is placed at the upper side of the chassis of image forming apparatus 1. Sheets on which images were formed by print unit 30 are ejected from the inner part of the chassis to copy receiving tray 5.

Print unit 30 is placed in the inner part of the chassis of image forming apparatus 1. Print unit 30 roughly has sheet conveying unit 200, toner image forming unit 300, fixing device 400, and drive unit (shown in FIG. 2) 500. Print unit 30 is configured to be able to synthesize four color images of CMYK by a so-called tandem system and form a color image on a sheet.

Sheet conveying unit 200 is configured with paper feeding roller 210, conveying roller 220, paper ejection roller 230, and so on. Each of paper feeding roller 210, conveying roller 220, and paper ejection roller 230 pinches a sheet by using two facing rollers and rotates the rollers to convey the sheet, for example. Paper feeding roller 210 feeds sheets from paper feeding cartridge 3 one by one. Paper feeding roller 210 feeds the sheets into the inner part of the chassis of image forming apparatus 1. Conveying roller 220 conveys sheets fed by paper feeding roller 210 to toner image forming unit 300. Conveying roller 220 conveys sheets via fixing device 400 to paper ejection roller 230. Paper ejection roller 230 discharges sheets conveyed by conveying roller 220 to the outside of the chassis of image forming apparatus 1.

Sheet conveying unit 200 may have rollers for conveying sheets other than the above mentioned rollers.

Toner image forming unit 300 is configured with 4 color toner bottles 301Y, 301M, 301C, 301K (they may be referred to as toner bottles 301 as a whole, in the following description), secondary transfer belt 305, transfer roller 307, 4 pairs of developing units 310Y, 310M, 310C, 310K (they may be referred to as developing units 310 as a whole, in the following description), laser scan unit 320, and so on.

Each of yellow toner bottle 301Y, magenta toner bottle 301M, cyan toner bottle 301C, and black toner bottle 301K stores toner colored of each of CMYK of yellow (Y), magenta (M), cyan (C), and black (K).

Secondary transfer belt 305 is in the form of a ring and is laid over between 2 rollers. Secondary transfer belt 305 rotates with sheet conveying unit 200. Transfer roller 307 is placed facing a part of secondary transfer belt 305 which keeps in contact with a roller. Sheets are conveyed being pinched by secondary transfer belt 305 and transfer roller 307.

Developing units 310 include photo conductors 311 (each of photo conductors 311Y, 311M, 311C, 311K is provided for each of developing units), developing devices, cleaners, electrostatic charging devices, and so on. Each of yellow developing unit 310Y, magenta developing unit 310M, cyan developing unit 310C, and black developing unit 310K is placed to form each of Y, M, C, and K images. Developing units 310 are parallely placed under secondary transfer belt 305. Laser scan unit 320 is placed being able to scan laser beams onto each of photo conductors 311.

In toner image forming unit 300, laser scan unit 320 forms latent images on photo conductors 311 electrostatically charged uniformly by electrostatic chargers, based on image data of each of YMCK colors. The developing devices form toner images of each color on each of photo conductors 311. Each of photo conductors 311 transfers toner images to secondary transfer belt 305 and forms a mirror image of a toner image to be formed on a sheet, on secondary transfer belt 305 (the first transfer). After that, by transfer roller 307 to which high electrical voltage is applied, toner images formed on secondary transfer belt 305 are transferred to the sheet. The toner images are formed on the sheet (the second transfer).

When toner quantity in developing unit 310 is reduced by image forming, toner stored in toner bottles 301 for each color is supplied to the developing units.

Fixing device 400 has heating roller 401 and press roller 403. Fixing device 400 conveys a sheet on which toner images were formed, pinching the sheet by heating roller 401 and press roller 403, to heat the sheet and apply pressure on the sheet. Herewith, fixing device 400 melts toner adhered to the sheet to fix it on the sheet, and forms images on the sheet. The sheet via fixing device 400 is discharged by paper ejection roller 230, from the chassis of image forming apparatus 1 to copy receiving tray 5.

Drive unit 500 has main motor 501, fixing motor 502, black developing motor 503, color developing motor 504, and color photo conductor motor 505, for example. Drive unit 500 is driven under control of CPU 21 (shown in FIG. 2) as mentioned below. Main motor 501 conveys sheets from the paper feeding process to the transfer process, and drives secondary transfer belt 305 and black photo conductor 311K. Fixing motor 502 drives fixing device 400. Black developing motor 503 drives black developing unit 310K. Color developing motor 504 drives yellow, magenta, and cyan developing units 310Y, 310M, 310C. Color photo conductor motor 505 drives yellow, magenta, and cyan photo conductors 311Y, 311M, 311C.

When image forming apparatus 1 receives printing instructions, sheets stored in paper feeding cartridge 3 are took off by paper feeding roller 210, one by one. Sheets are conveyed by paper feeding roller 210 and conveying roller 220. Photo conductors 311Y, 311M, 311C, 311K electrostatically charged for each color is exposed by laser scan unit 320, based on image data in parallel with paper feeding. Toner images are formed on photo conductors 311, by developing with toner in developing units 310Y, 310M, 310C, 310K for each color. Toner images formed on photo conductors 311 for each color are transferred to secondary transfer belt 305. 4 color toner images are formed on secondary transfer belt 305. Next, electrical voltage is applied to transfer roller 307, and toner images formed on secondary transfer belt 305 are transferred to a sheet being conveyed. Toner images formed on the sheet are fixed on the sheet, when the sheet passes through fixing device 400 and is heated and pressurized. The sheet on which toner images were fixed is discharged to copy receiving tray 3 by paper ejection roller 230.

Electric power supply device 600 is a low voltage electric power supply to provide driving electric power and controlling electric power which are comparatively low voltage, to each part of image forming apparatus 1. The detailed structure of electric power supply device 600 will be explained below.

Figure 2:
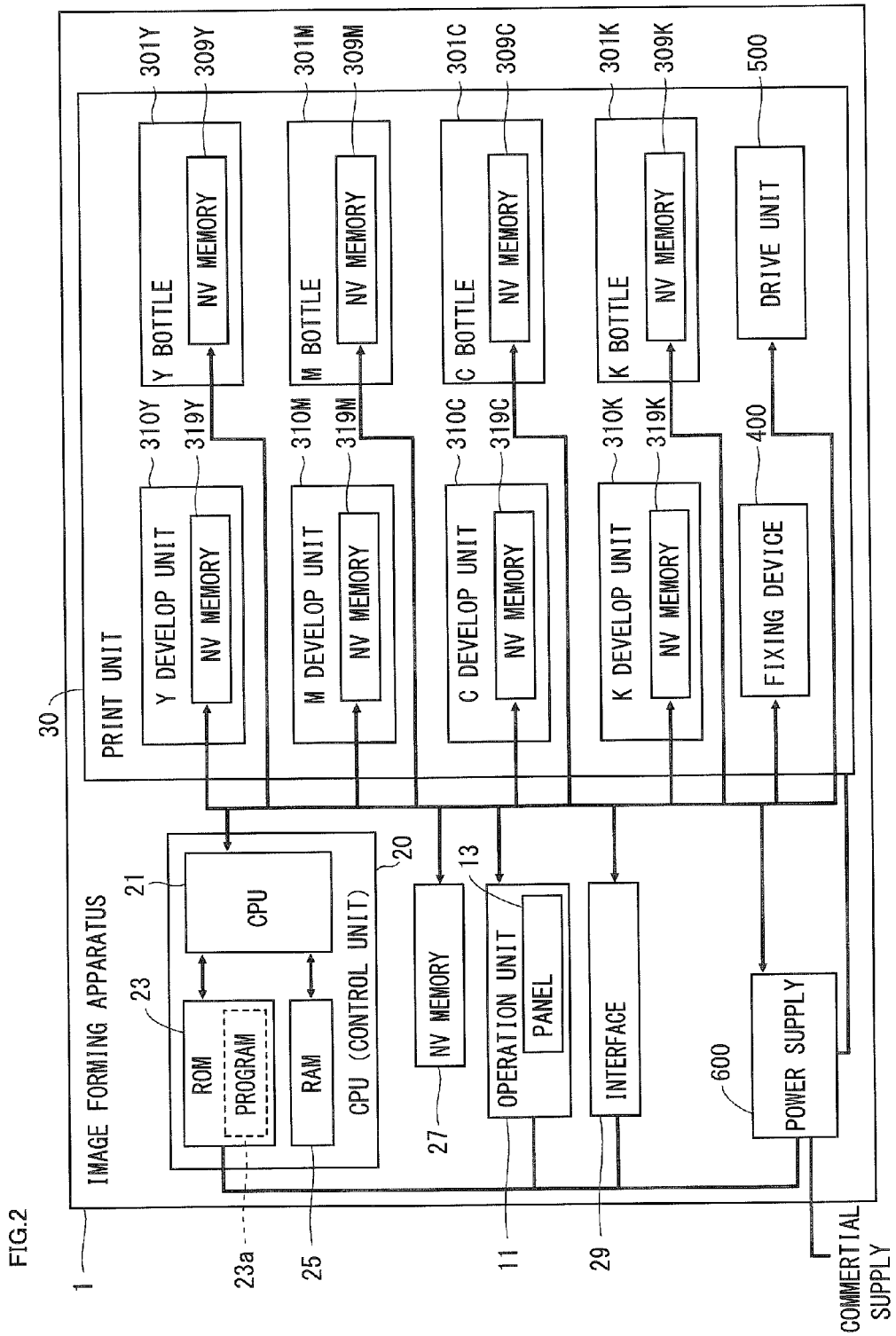
FIG. 2 is a block diagram showing a structure of the image forming apparatus.

FIG. 2 is a block diagram showing a structure of the image forming apparatus.

Referring to the figure, image forming apparatus 1 is further equipped with operation unit 11, control unit (CPU unit) 20, non volatile memory 27, and interface unit 29.

Operation unit 11 is placed on a chassis of image forming apparatus 1 to be operated by users. Display panel 13 is installed on operation unit 11. Display panel 13 is a LCD (Liquid Crystal Display) having a touch panel, for example. Display panel 13 displays a guide screen for a user and operation buttons for receiving touch operations from a user. Display panel 13 performs displaying under control of CPU 21 of control unit 20. When display panel 13 or an operation button (not shown in Figures) is operated by a user, operation unit 11 transmits an operation signal or a predetermined command corresponding to the operation to CPU 21. More specifically, a user makes image forming apparatus 1 perform various sorts of behavior by operating operation unit 11.

Control unit 20 has CPU 21, ROM (Read Only Memory) 23, RAM (Random Access Memory) 25, and so on. Control unit 20 is connected to a system bus, together with an operation unit 11, non volatile memory 27, interface unit 29, electric power supply device 600, and so on. Herewith, control unit 20 is connected with each part of image forming apparatus 1 to be able to send and receive signals.

CPU 21 executes control program 23a or the like stored in ROM 23, RAM 25, non volatile memory 27, or the like, to control various sorts of behavior of image forming apparatus 1. When operation unit 11 sends an operation signal, a client PC sends an operation command, or the like, CPU 21 executes the corresponding control program 23a. Herewith, in response to operation on operation unit 11 by a user or the like, image forming apparatus 1 works.

ROM 23 is a flash ROM (Flash Memory), for example. ROM 23 stores data for performing behavior of image forming apparatus 1. ROM 23 further stores control program (program) 23a for performing various sorts of behavior of image forming apparatus 1. ROM 23 may store function setting data or the like for image forming apparatus 1. CPU 21 executes predetermined processes, to read data from ROM 23 and write data into ROM 23. ROM 23 may be not rewritable.

RAM 25 is a main memory for CPU 21. RAM 25 stores data which is needed when CPU 21 executes control program 23a.

Non volatile memory 27 stores information which should be stored after image forming apparatus 1 is turned off, for example, information which relates to a lifetime state such as the number of prints. Non volatile memory 27 stores job data being transmitted from the outside via interface unit 29, for example. Non volatile memory 27 may be configured to store setting information for image forming apparatus 1, control programs for performing various sorts of behavior of image forming apparatus 1, or the like. Non volatile memory 27 can store a plurality of jobs transmitted from a client PC, a plurality of client PCs, or the like. Non volatile memory 27 is configured with a HDD (Hard Disk Drive), or flash ROM, for example.

Interface unit 29 is configured by combination of a hardware unit such as a NIC (Network Interface Card), and a software unit for performing communication by predetermined communications protocol, for example. Interface unit 29 connects image forming apparatus 1 to external networks such as a LAN. Herewith, image forming apparatus 1 can communicate with external devices such as client PCs which are connected with external networks. Image forming apparatus 1 can receive jobs from client PCs. Image forming apparatus 1 can send image data to client PCs and send image data via a mail server by E-mail.

Interface unit 29 may be configured to be able to connect with external networks by wireless communication. Interface unit 29 may be a USB (Universal Serial Bus) interface, for example. In this instance, interface unit 29 makes external devices which are connected by communication cables and image forming apparatus 1 be communicatable with each other.

Electric power supply device 600 is provided in the inner part of the chassis of image forming apparatus 1. Electric power supply device 600 is connected with a commercial electric power supply, and provides electric power to each part of image forming apparatus 1 based on the commercial electric power supply.

Each of developing units 310Y, 310M, 310C, 310K is provided with each of non volatile memories 319Y, 319M, 319C, 319K. Each of toner bottles 301Y, 301M, 301C, 301K is provided with each of non volatile memories 309Y, 309M, 309C, 309K. Developing units 310 and toner bottles 301 are consumables. CPU 21 stores information of lifetime states for the consumables or the like, in non volatile memories 319Y to 319K, 309Y to 309K. Herewith, in case that a consumable is removed and attached to another image forming apparatus, the lifetime state of the consumable is reflected to the image forming apparatus to which the consumable is attached. The lifetimes of consumables can be certainly managed, and images can be appropriately printed.

For example, image forming apparatus 1 has a normal behavior mode in which normal printing or the like is performed, and a sleep mode (an energy saving mode) which uses less power than the normal behavior mode, as behavior modes. Image forming apparatus 1 moves to the sleep mode, when printing or the like was not performed during a predetermined period under the normal behavior mode, for example. Image forming apparatus 1 moves to the normal behavior mode, when printing or the like is performed under the sleep mode, for example. Power consumption of image forming apparatus 1 can be reduced, since image forming apparatus 1 works in a sleep mode when image forming apparatus 1 is not used temporarily.

[The Structure of Electric Power Supply Device 600]

Next, the structure of electric power supply device 600 will be explained.

Figure 3:
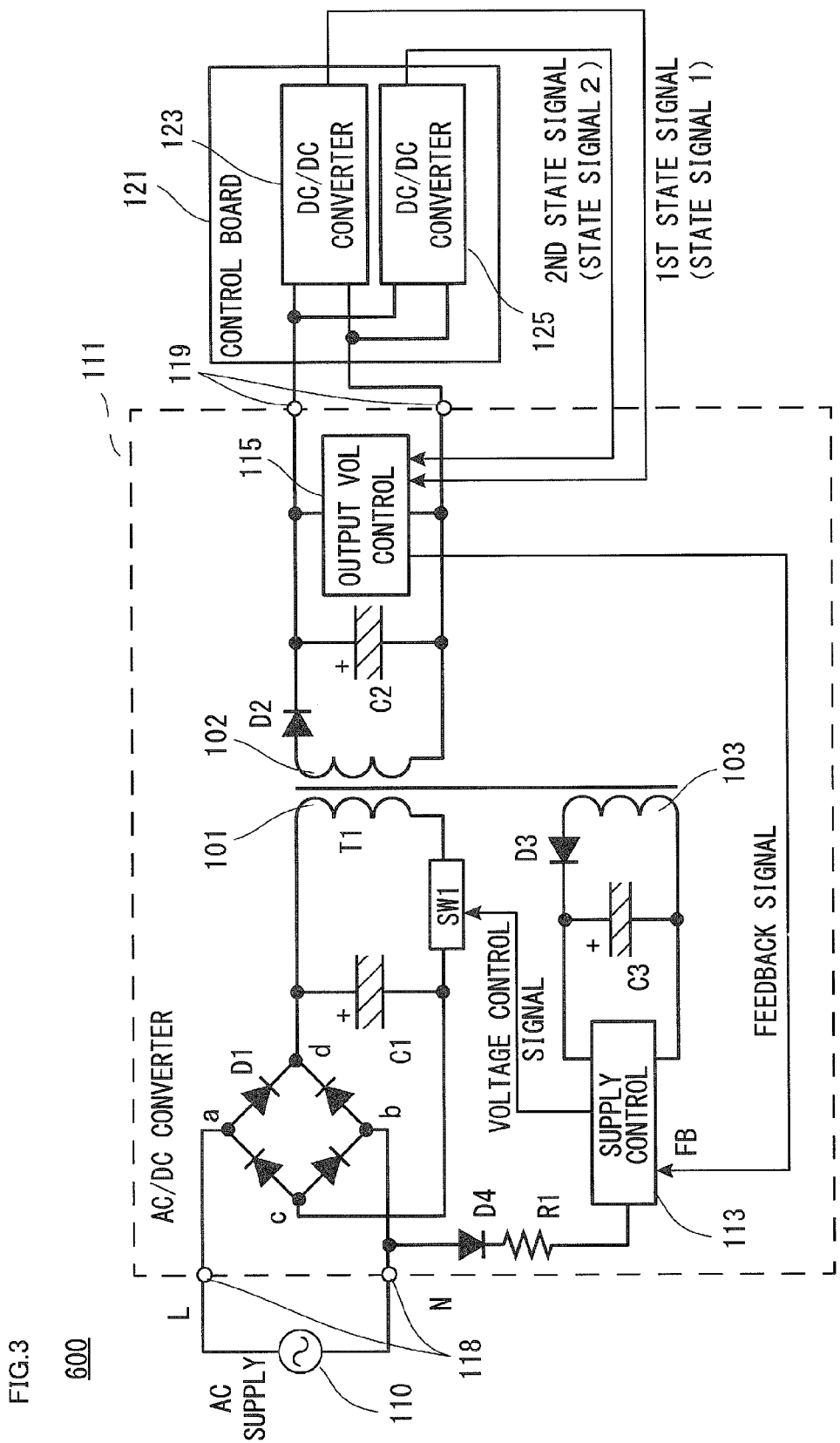
FIG. 3 is a circuit diagram showing a structure of the electric power supply device.

FIG. 3 is a circuit diagram showing a structure of electric power supply device 600.

As shown in FIG. 3, electric power supply device 600 includes AC/DC converter (an example of a first converter) 111, and control circuit board 121. Inputting terminal 118 of AC/DC converter 111 is connected with alternating current electric power supply 110. Control circuit board 121 is provided with two DC/DC converters (examples of second converters) 123, 125.

In the embodiment, an output of low voltage electric power supply of AC/DC converter 111 is controlled, as described below. The control is executed, so that DC/DC converters 123, 125 in control circuit board 121 can maintain the drive in intermittent oscillation or the drive in frequency reduction oscillation (the behavior may be referred to as low electrical voltage behavior). Herewith, DC/DC converters 123, 125 can increase the efficiency.

Alternating current electric power supply 110 is full wave rectified by rectification diode D1. More specifically, an L line connected with the alternating current electric power supply is connected to node "a" of rectification diode D1. An N line connected with the alternating current electric power supply is connected to node "b" of rectification diode D1.

Alternating current electric power supply 110 which was full wave rectified is smoothed by primary smoothing condenser C1. More specifically, node "d" of rectification diode D1 is connected with +(plus) terminal of primary smoothing condenser C1. Node "c" of rectification diode D1 is connected with − (minus) terminal of primary smoothing condenser C1.

Alternating current electric power supply 110 is supplied to electric power supply control unit 113 as a start up electric power supply for electric power supply control unit 113. Node "b" of rectification diode D1 is connected with electric power supply control unit 113 via rectification diode D4 and start up resistor R1.

Primary winding 101 of transformer T1 is parallely connected with primary smoothing condenser C1. Switch SW1 is interposed between primary winding 101 and "−" terminal of primary smoothing condenser C1. By switching behavior of switch SW1, electric power is supplied to secondary winding side 102 and subsidiary winding side 103 of transformer T1.

Subsidiary winding 103 provides electric power to electric power supply control unit 113. Subsidiary winding 103 is connected with electric power supply control unit 113, being parallely connected with smoothing condenser C3. Between subsidiary winding 103 and "+" terminal of smoothing condenser C3, rectification diode D3 is interposed.

Secondary winding 102 is connected with outputting terminal 119 of AC/DC converter 111. On lines which connect secondary winding 102 and DC/DC converters 123, 125, secondary smoothing condenser C2 and outputting electrical voltage control unit 115 are placed parallely with respect to secondary winding 102. Rectification diode D2 is interposed between secondary winding 102 and "+" terminal of secondary smoothing condenser C2. Secondary winding 102 outputs direct electric current output from AC/DC converter 111 via rectification diode D2.

Outputting terminal 119 of AC/DC converter 111 is connected with each of DC/DC converter 123 and DC/DC converter 125. Each of DC/DC converter 123, DC/DC converter 125, and outputting electrical voltage control unit 115 is parallely connected with each other.

In the embodiment, two DC/DC converters 123, 125 are placed in control circuit board 121. In control circuit board 121, one DC/DC converter may be placed. In control circuit board 121, more than two DC/DC converters may be placed.

DC/DC converter 123 outputs a first state signal (state signal 1). DC/DC converter 125 outputs a second state signal (state signal 2). These state signals are input into outputting electrical voltage control unit 115. Outputting electrical voltage control unit 115 outputs a feedback signal to terminal FB of electric power supply control unit 113, based on the input state signal.

Next, the behavior of electric power supply device 600 will be explained.

Alternating current electric power supply 110 is supplied to electric power supply control unit 113 via rectification diode D4 and start up resistor R1 (start up electric power supply). Alternating current electric power supply 110 is full wave rectified by rectification diode D1, and supplied to primary smoothing condenser C1. Herewith, alternating current electric power supply 110 is smoothed and direct electric current voltage is generated. When the start up electric power supply is supplied, electric power supply control unit 113 begins to control switching of transformer T1. Herewith, the direct electric current voltage is chopped and transformed. The transformed direct electric current voltage is supplied to secondary winding 102 and subsidiary winding 103.

Alternating current electrical voltage being provided to subsidiary winding 103 is rectified by rectification diode D3, and smoothed by smoothing condenser C3. Herewith, the alternating current electrical voltage is supplied to electric power supply control unit 113, as electric power supply voltage.

Alternating current electrical voltage being provided to secondary winding 102 is rectified by rectification diode D2, and smoothed by secondary smoothing condenser C2. Herewith, direct electric current voltage is output from AC/DC converter 111.

An electrical voltage control unit (an example of an electrical voltage control means) is configured with outputting electrical voltage control unit 115 and control circuit board 121. Outputting electrical voltage control unit 115 monitors the first state signal from DC/DC converter 123 and the second state signal from DC/DC converter 125. Each of state signals indicates that each of corresponding DC/DC converters 123, 125 becomes under the predetermined state. More specifically, when each of DC/DC converters 123, 125 works by intermittent oscillation or when the switching frequency declined (working under frequency declined oscillation), the state signal is turned to "H" (High). At other times, the state signal is turned to "L" (Low). More specifically, outputting electrical voltage control unit 115 recognizes that each of DC/DC converters 123, 125 is performing low electric power behavior, as the working state.

More specifically, outputting electrical voltage control unit 115 outputs a feedback signal, so that outputting electrical voltage of AC/DC converter 111 becomes constant, under normal conditions. When the state signal is turned to "L", outputting electrical voltage control unit 115 reduces the feedback signal level, so that the outputting electrical voltage increases. Herewith, the outputting electrical voltage of AC/DC converter 111 increases. More specifically, input electrical voltage of DC/DC converters 123, 125 increases. The input electrical voltage of DC/DC converters 123, 125 is controlled, so that the input electrical voltage of DC/DC converters 123 is equal to or less than the minimum value of upper limits of operating electrical voltage of DC/DC converters 123, 125 and is more than or equal to the maximum value of lower limits of operating electrical voltage of DC/DC converters 123, 125.

Figure 4:
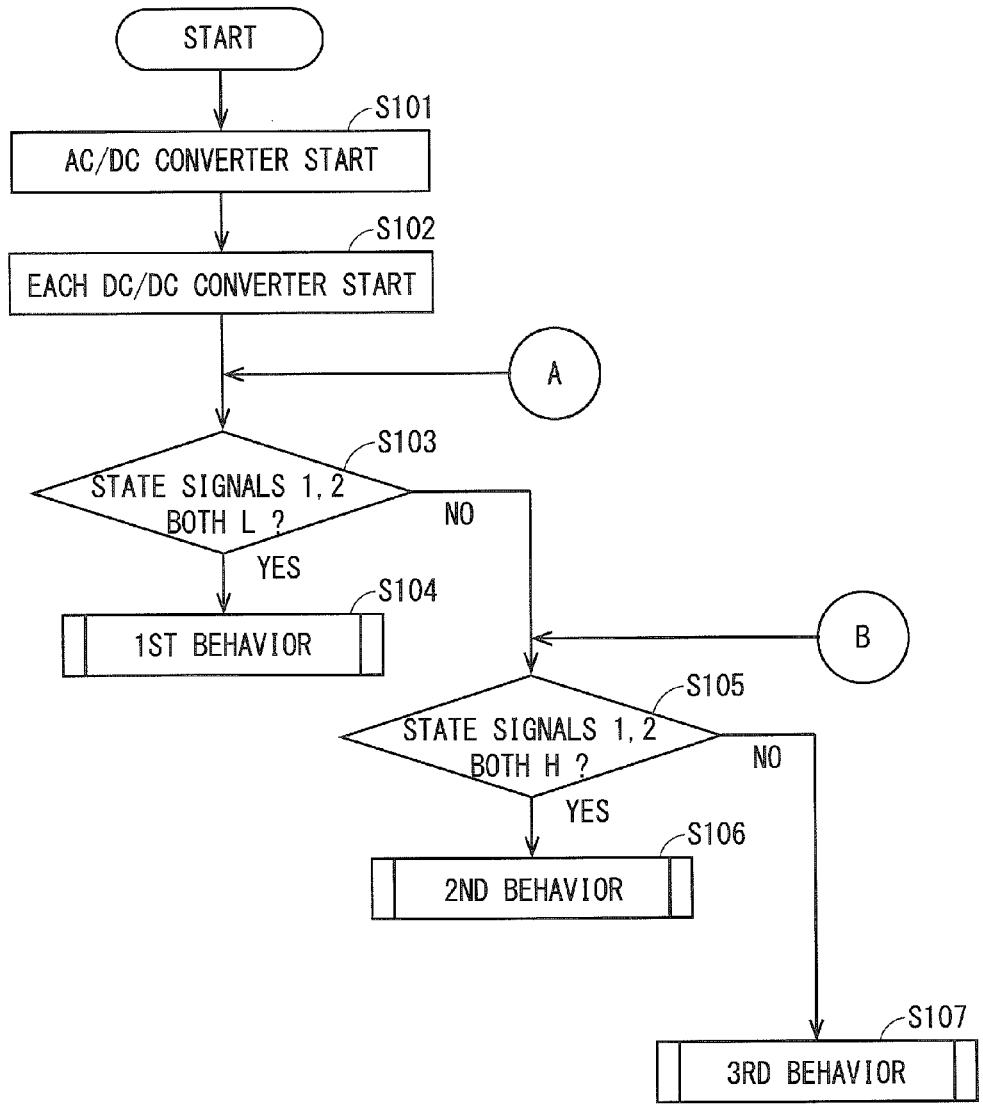
FIG. 4 is a flowchart showing behavior of an electric power supply device.

FIG. 4 is a flowchart showing behavior of electric power supply device 600.

As shown in FIG. 4, AC/DC converter 111 starts up at step S101.

DC/DC converters 123, 125 start up at step S102.

When both the first state signal and the second state signal are "L" at step S103, the process of step S104 is executed. More specifically, when both DC/DC converters 123, 125 are not performing intermittent oscillation or frequency declined oscillation, the process of step S104 is executed. Otherwise, the process of step S105 is executed.

At step S104, the first behavior is performed. The first behavior will be explained below.

When both the first state signal and the second state signal are "H" at step S105, the process of step S106 is executed. More specifically, when both DC/DC converters 123, 125 are performing intermittent oscillation or frequency declined oscillation, the process of step S106 is executed. Otherwise, the process of step S107 is executed.

At step S106, the second behavior is performed. The second behavior will be explained below.

At step S107, the third behavior is performed. The third behavior will be explained below.

Figure 5:
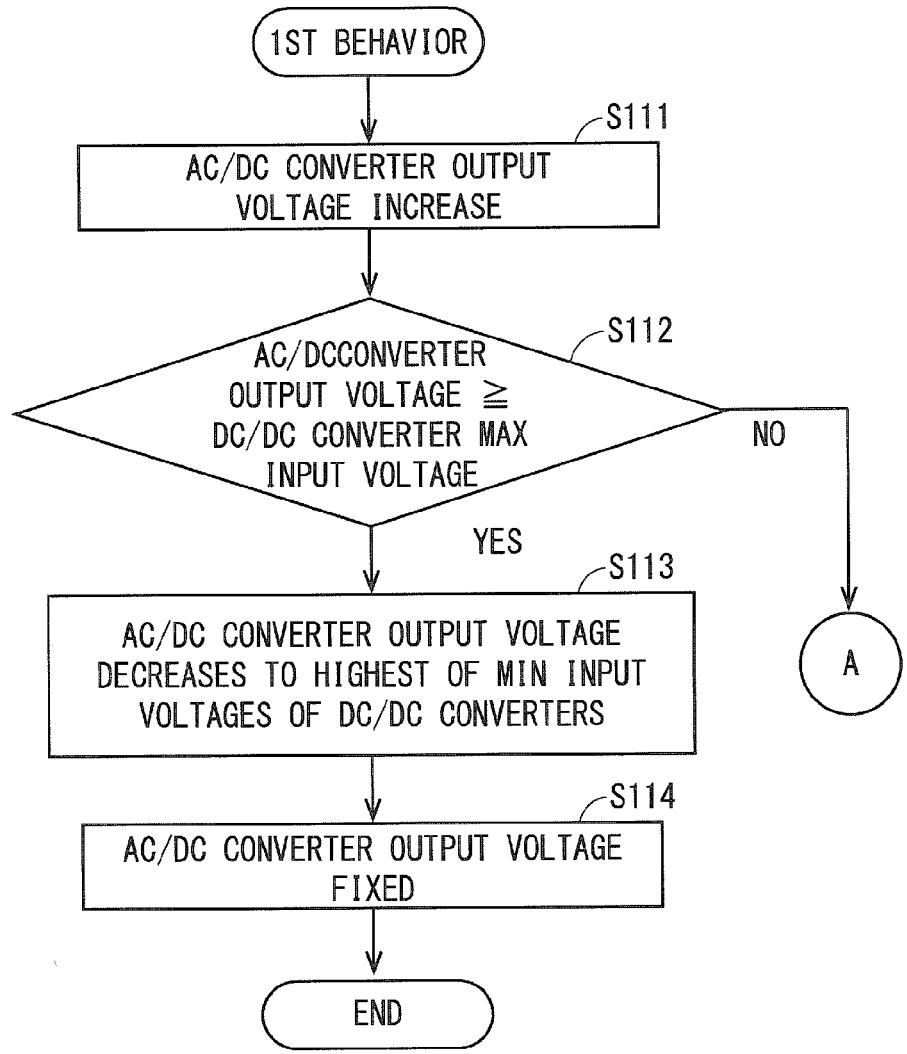
FIG. 5 is a flowchart showing the first behavior.

FIG. 5 is a flowchart showing the first behavior.

When both DC/DC converters 123, 125 is not performing intermittent oscillation or frequency declined oscillation, the first behavior is performed. As shown in FIG. 5, at step S111, outputting electrical voltage control unit 115 decreases the feedback signal being output to electric power supply control unit 113. Herewith, outputting electrical voltage of AC/DC converter 111 increases.

At step S112, whether outputting electrical voltage of AC/DC converter 111 is more than or equal to a maximum input electrical voltage of DC/DC converter 123 or more than or equal to a maximum input electrical voltage of DC/DC converter 125 is determined. When outputting electrical voltage of AC/DC converter 111 is more than or equal to the maximum input electrical voltage, it is impossible for DC/DC converters 123, 125 to perform intermittent oscillation or frequency declined oscillation at this load electrical current, and the process of step S113 is executed. Otherwise, the process of step S103 is executed.

At step S113, outputting electrical voltage of AC/DC converter 111 is controlled, so that the outputting electrical voltage of AC/DC converter 111 decreases to the highest of minimum input electrical voltages of DC/DC converters 123, 125.

At step S114, outputting electrical voltage of AC/DC converter 111 is fixed.

According to the first behavior, outputting electrical voltage of AC/DC converter 111 is incremented by a constant value. When the outputting electrical voltage is more than or equal to the maximum input electrical voltage of one of DC/DC converters 123, 125, the outputting electrical voltage is decreased to the highest of minimum input electrical voltages of DC/DC converters 123, 125 and fixed.

Figure 6:
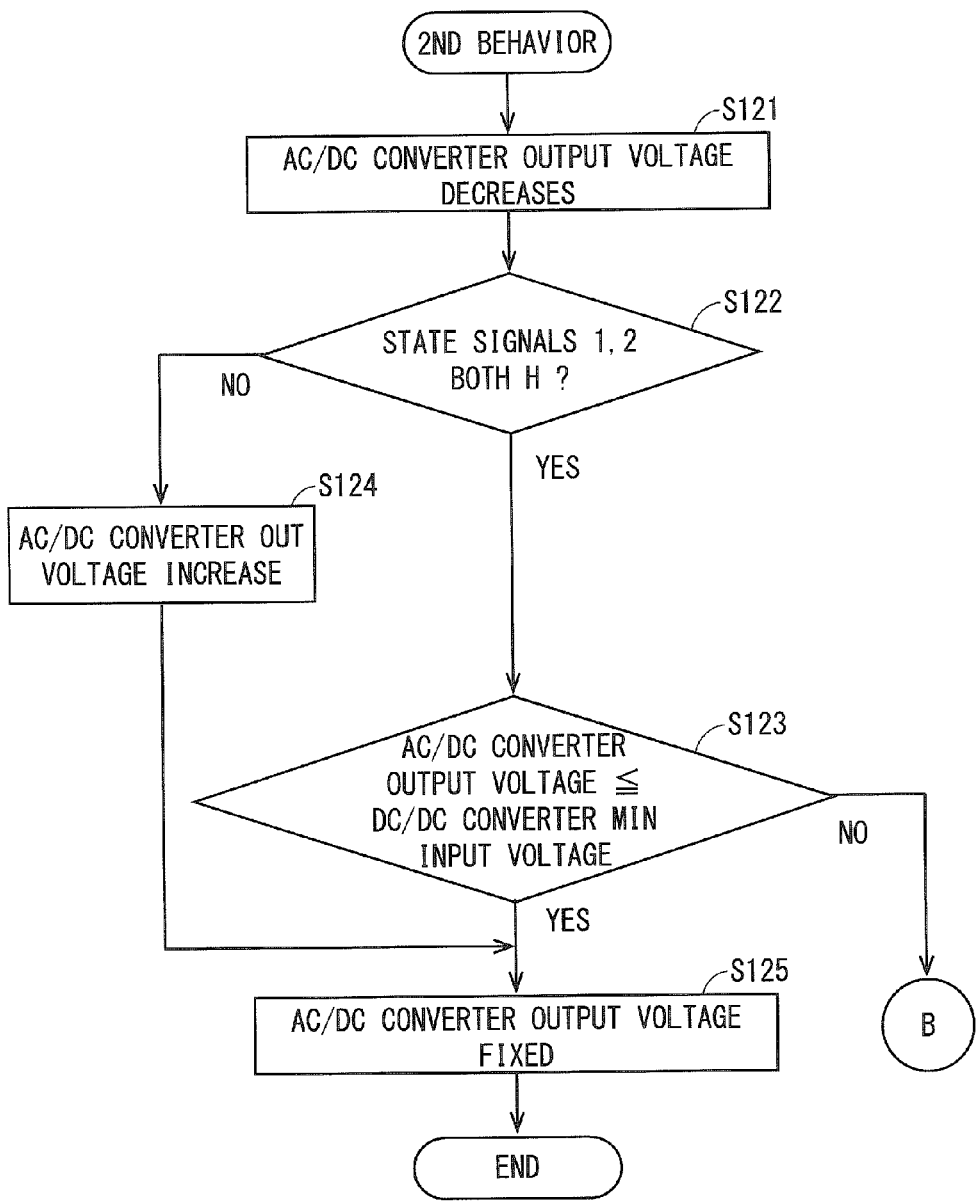
FIG. 6 is a flowchart showing the second behavior.

FIG. 6 is a flowchart showing the second behavior.

When both DC/DC converters 123, 125 are performing intermittent oscillation or frequency declined oscillation, the second behavior is performed. As shown in FIG. 6, at step S121, outputting electrical voltage of AC/DC converter 111 is decreased.

When the first state signal and the second state signal are "H" at step S122, the process of step S123 is executed. Otherwise (when at lease one of the first state signal and the second state signal becomes "L"), the process of step S124 is executed.

At step S123, whether outputting electrical voltage of AC/DC converter 111 is equal to or less than the highest of minimum input electrical voltages of DC/DC converter 123 and DC/DC converter 125 is determined. More specifically, whether the first state signal and the second state signal are "H" or not is determined when outputting electrical voltage of AC/DC converter 111 is decreased to the highest of minimum input electrical voltages of DC/DC converters 123, 125. When YES at S123, the process of step S125 is executed. Otherwise, the process of step S105 is executed.

At step S124, outputting electrical voltage of AC/DC converter 111 is increased. The outputting electrical voltage is controlled so that the outputting electrical voltage increases, until the first state signal and the second state signal are "H".

At step S125, outputting electrical voltage of AC/DC converter 111 is fixed.

According to the second behavior, the outputting electrical voltage of AC/DC converter 111 decreases as much as possible, to the extent that DC/DC converters 123, 125 are performing intermittent oscillation or frequency declined oscillation. More specifically, in case that the first state signal and the second state signal are "H" when outputting electrical voltage decreases to the highest of minimum input electrical voltages of DC/DC converters 123, 125, the electrical voltage value is fixed. Otherwise, in case that a state signal of one of DC/DC converters 123, 125 becomes "L" when outputting electrical voltage is decreased, the outputting electrical voltage is increased until both state signals become "H" and the outputting electrical voltage is fixed.

Figure 7:
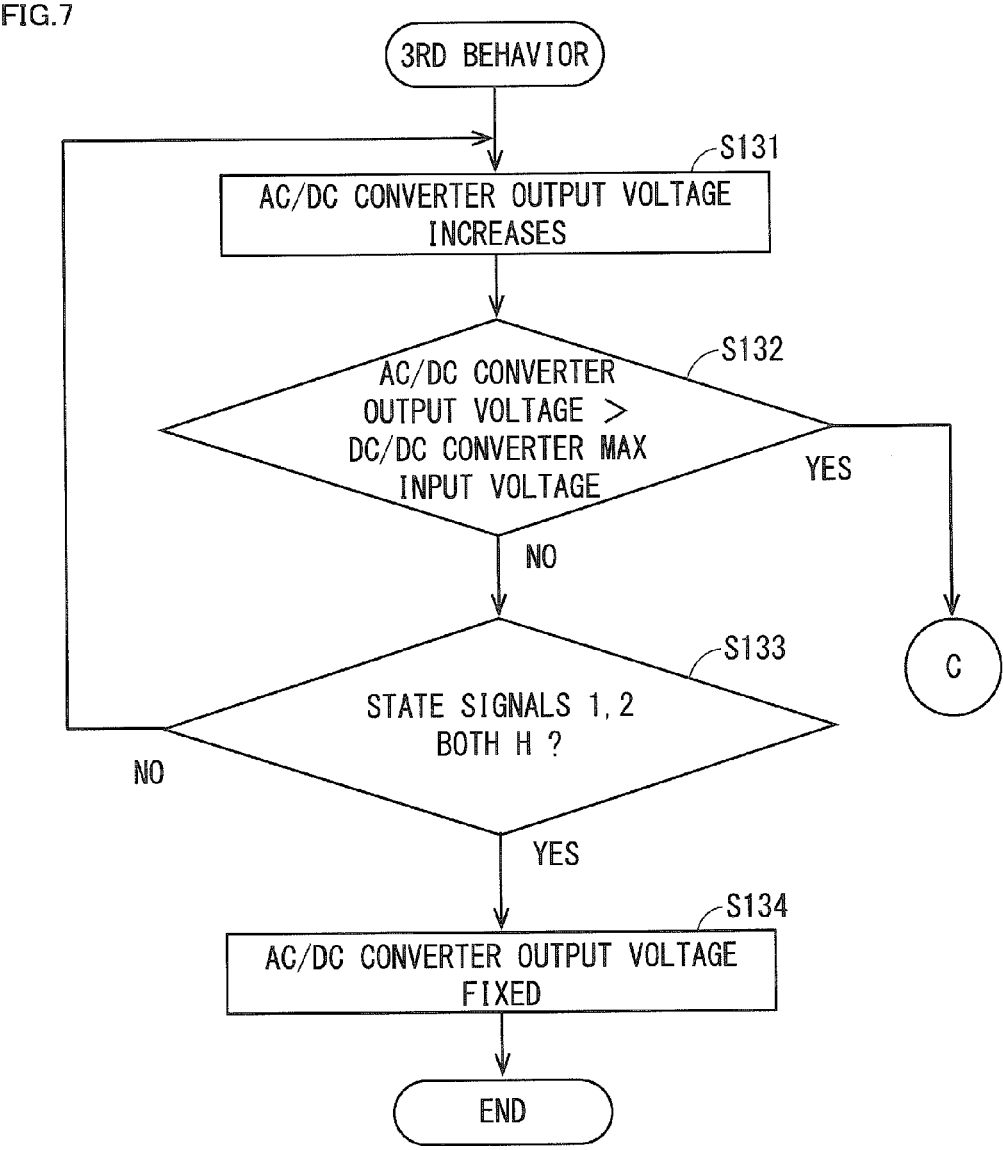
FIGS. 7 and 8 are flowcharts showing the third behavior.

FIG. 7 is a first flowchart showing the third behavior.

According to the third behavior, at step S131, outputting electrical voltage control unit 115 decreases the feedback signal being output to electric power supply control unit 113. Herewith, outputting electrical voltage of AC/DC converter 111 increases.

At step S132, whether the outputting electrical voltage of AC/DC converter 111 is more than the maximum input electrical voltage of DC/DC converter 123 or the maximum input electrical voltage of DC/DC converter 125 is determined. When the outputting electrical voltage is more than the maximum input electrical voltage, the process of step S141 is executed. Otherwise, the process of step S133 is executed.

When both the first state signal and the second state signal are "H" at step S133, the process of step S134 is executed. Otherwise (when one of the first state signal and the second state signal becomes "L"), the process of step S131 is executed.

At step S134, outputting electrical voltage of AC/DC converter 111 is fixed. More specifically, since outputting electrical voltage of AC/DC converter 111 is increased, when both the first state signal and the second state signal become "H", the outputting electrical voltage is fixed.

Figure 8:
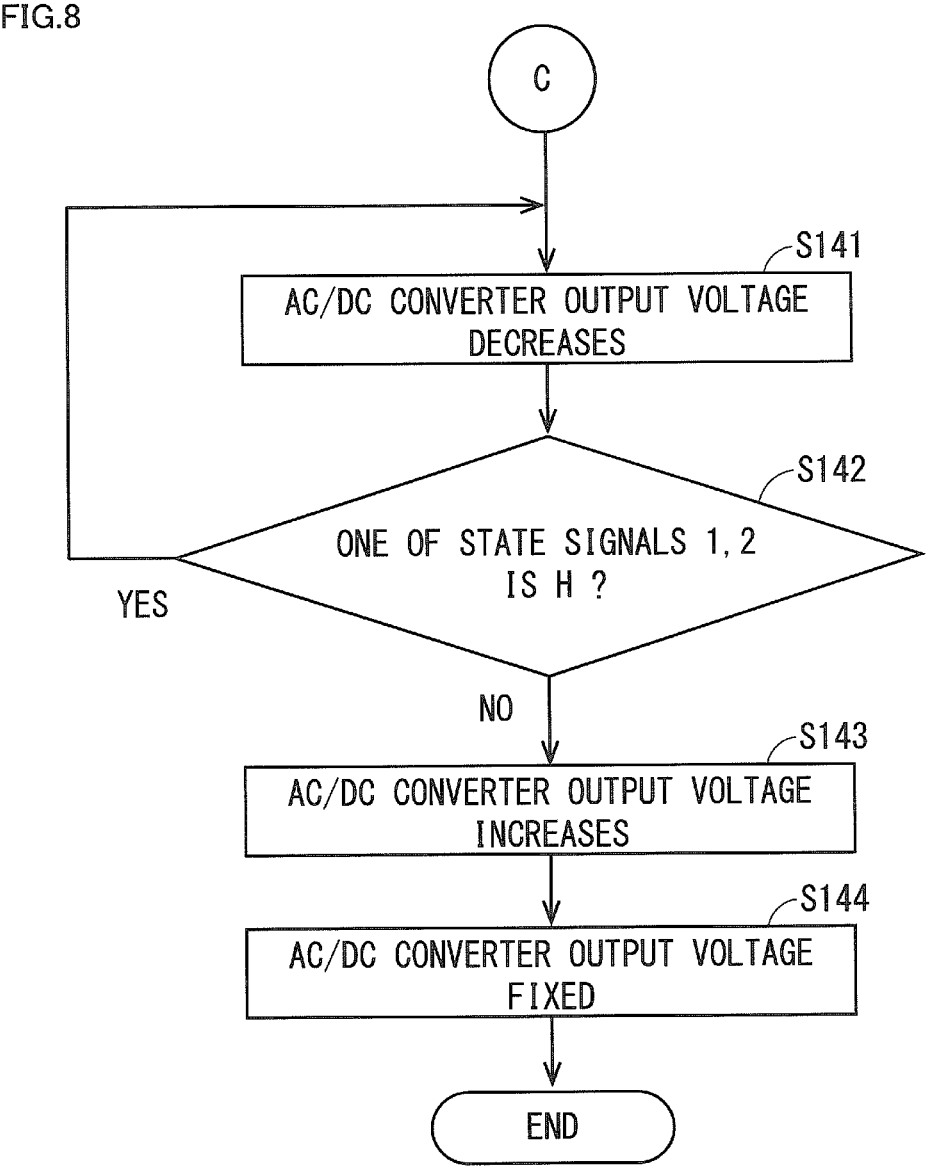

FIG. 8 is a second flowchart showing the third behavior.

Otherwise, at step S141, the outputting electrical voltage of AC/DC converter 111 is decreased.

When one of the first state signal and the second state signal is "H" at step S142, the process of step S141 is executed. Otherwise (when both the first state signal and the second state signal become "L"), the process of step S143 is executed.

At step S143, the outputting electrical voltage of AC/DC converter 111 is controlled, so that the outputting electrical voltage is increased.

At step S144, the outputting electrical voltage of AC/DC converter 111 is fixed.

According to behavior of step S141 to step S144, in case that both the first state signal and the second state signal do not become "H" when the outputting electrical voltage is increased to the minimum value of maximum input electrical voltages of DC/DC converters 123, 125, the outputting electrical voltage is decreased to the extent that one of the first state signal and the second state signal becomes "H" and the outputting electrical voltage is fixed. The reason is that the efficiency is better when input electrical voltages of DC/DC converters 123, 125 are low, in case that both the DC/DC converters 123, 125 can not perform intermittent oscillation or frequency declined oscillation.

As explained above, according to the embodiment, input electrical voltage being supplied from AC/DC converter 111 to DC/DC converters 123, 125 changes, so that DC/DC converters 123, 125 can perform low electrical voltage behavior such as intermittent oscillation or frequency declined oscillation when the load is light, for example. The efficiency of electric power supply device 600 is higher when low electrical voltage behavior is performed although the input electrical voltage is slightly high, than the input electrical voltage decreases without low electrical voltage behavior. Hence, the electric power supply converting efficiency of electric power supply device 600 can be improved. The outputting electrical voltage of AC/DC converter 111 is adjusted to a voltage corresponding to a load electrical current of electric power supply device 600. Then, DC/DC converters 123, 125 can work at high efficiency.

Whether DC/DC converters 123, 125 are performing intermittent oscillation or frequency declined oscillation is determined, based on signals acquired from the inner part of DC/DC converters 123, 125, as substitute for the first state signal and the second state signal.

Figure 9:
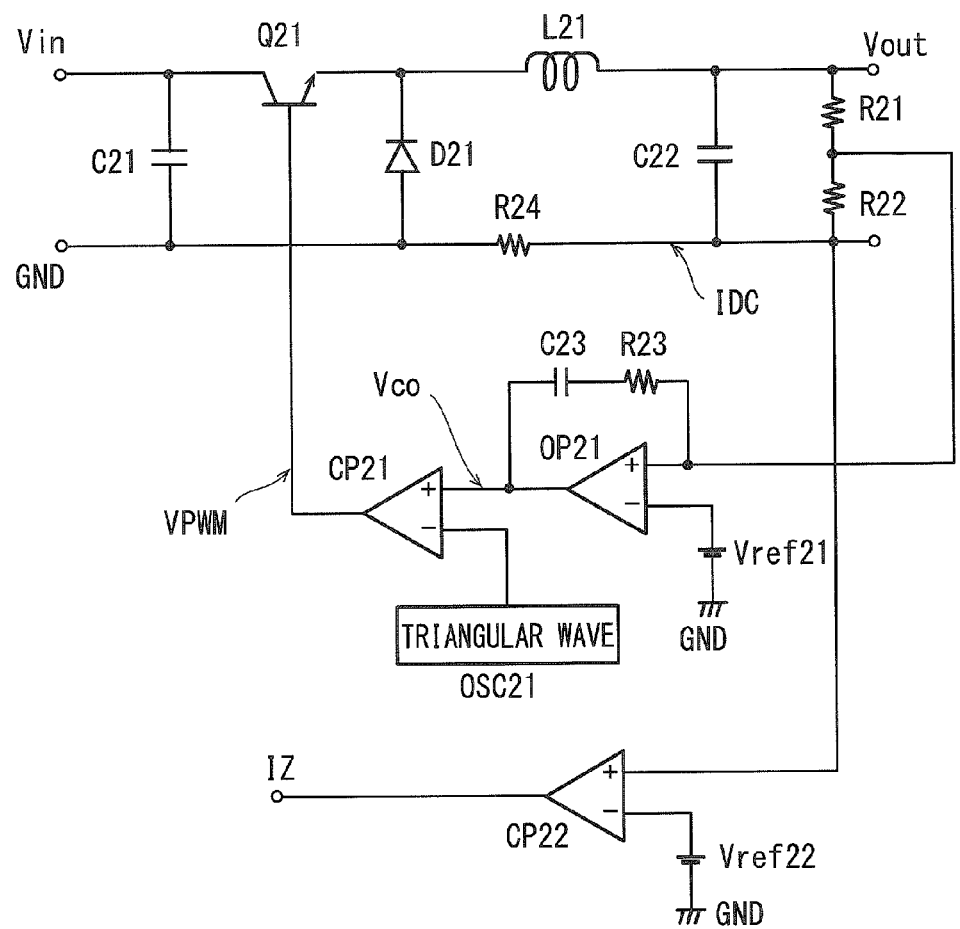
FIG. 9 shows an example of a circuit structure of the DC/DC converter.

FIG. 9 shows an example of a circuit structure of the DC/DC converters 123, 125.

As seen from FIG. 9, DC/DC converters 123, 125 input electrical voltage Vin, and output outputting electrical voltage Vout to which input electrical voltage Vin is converted by a step down chopper circuit. The step down chopper circuit has input condenser C21, chopper transistor Q21, flywheel diode D21, smoothing reactor L21, and smoothing condenser C22.

According to the step down chopper circuit, feedback electrical voltage which is made by dividing of outputting electrical voltage Vout by resistors R21, R22 is generated. The feedback electrical voltage is controlled by using reference electrical voltage Vref21 at proportion control operational amplifier OP21, condenser C23 and resistor R23, and output from proportion control operational amplifier OP21 as control amplifier output Vco. Control amplifier output Vco is compared with the output of triangular wave oscillator OSC21 by comparator CP21. Comparator CP21 outputs control signal VPWM as a PWM (pulse width modulation) signal. Control signal VPWM is input to transistor Q21. Transistor Q21 performs switching behavior.

When transistor Q21 is enabled, electrical current flows through smoothing reactor L21, and smoothing condenser C22 is charged. When transistor Q21 is disabled, energy of smoothing reactor L21 is released to smoothing condenser C22 via flywheel diode D21. Herewith, constant voltage control of outputting electrical voltage Vout is performed.

At this time, when intermittent oscillation is performed, reactor electrical current of smoothing reactor L21 may drop to zero and reactor electrical current may be discontinuous. The reactor electrical current is detected as electrical voltage by electrical current detection resistor R24 connected to a line between smoothing condenser C22 and flywheel diode D21. More specifically, comparator CP22 compares electrical voltage of a connecting point of electrical current detection resistor R24 and smoothing condenser C22 with reference electrical voltage Vref22 which is around 0V, and the electrical voltage is detected as zero electrical current output Iz. By determining that zero electrical current output Iz becomes "H" (High), intermittent oscillation of DC/DC converters 123, 125 can be detected. Therefor, by utilizing zero electrical current output Iz as substitute for the above state signal, electrical current output of AC/DC converter 111 can be adjusted in response to a behavior state of DC/DC converters 123, 125, as mentioned above.

The amount of control amplifier output Vco and control signal VPWM when entering a discontinuous mode are beforehand recognized, based on load electrical current. Hence, whether DC/DC converters 123, 125 are performing intermittent oscillation or not may be detected, by determining that the amount of control amplifier output Vco is equal to or less than a preset value or detecting a duty ratio of control signal VPWM or the like.

Whether DC/DC converters 123, 125 are performing intermittent oscillation may be detected, based on control amplifier output Vco of proportion control operational amplifier OP21.

Figure 10:
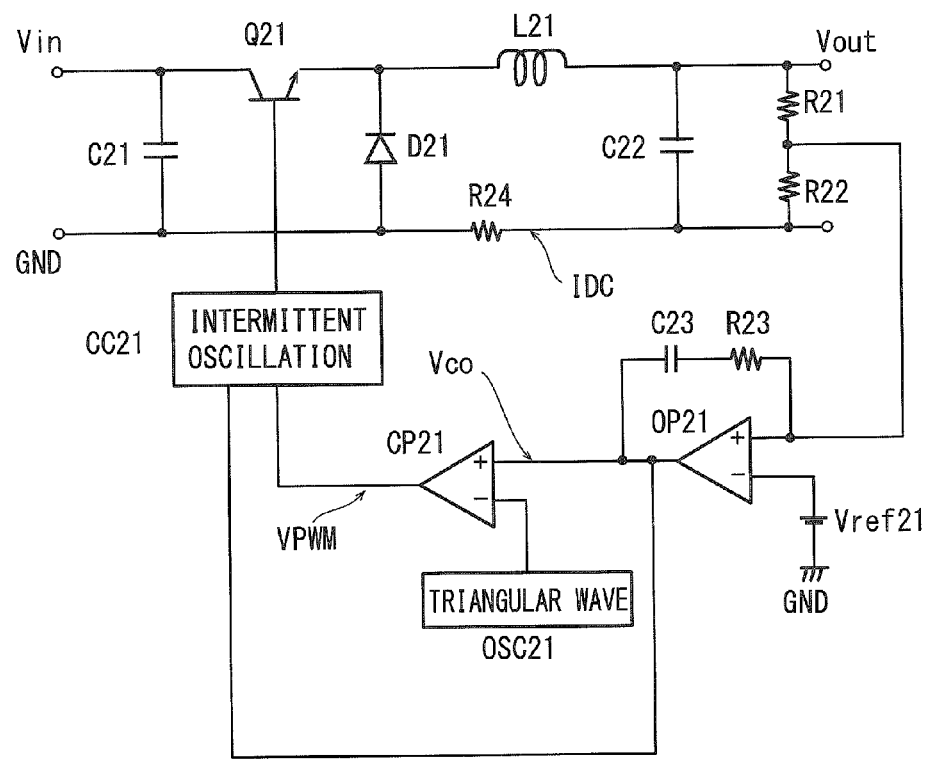
FIG. 10 shows another example of a circuit structure of the DC/DC converter.

FIG. 10 shows another example of a circuit structure of DC/DC converter 123, 125.

Compared with the circuit structure of FIG. 9, the circuit of FIG. 10 does not have comparator CP22 and zero electrical current output Iz being output from comparator CP22, and has intermittent oscillation control circuit CC21. When control amplifier output Vco of proportion control operational amplifier OP21 is equal to or less than a preset value, intermittent oscillation control circuit CC21 thins out waves of control signal VPWM, so that intermittent oscillation is performed.

When adopting a circuit structure of FIG. 10, the presence or absence of intermittent oscillation can be detected, by monitoring control amplifier output Vco.

The Second Embodiment

A basic structure of image forming apparatus 1 and a basic structure the electric power supply device in the second embodiment are same as the first embodiment. These explanations will not be repeated. The second embodiment differs from the first embodiment, in that electrical voltage instructions are output from a control unit of a control circuit board to an outputting electrical voltage control unit in electric power supply device 600.

Figure 11:
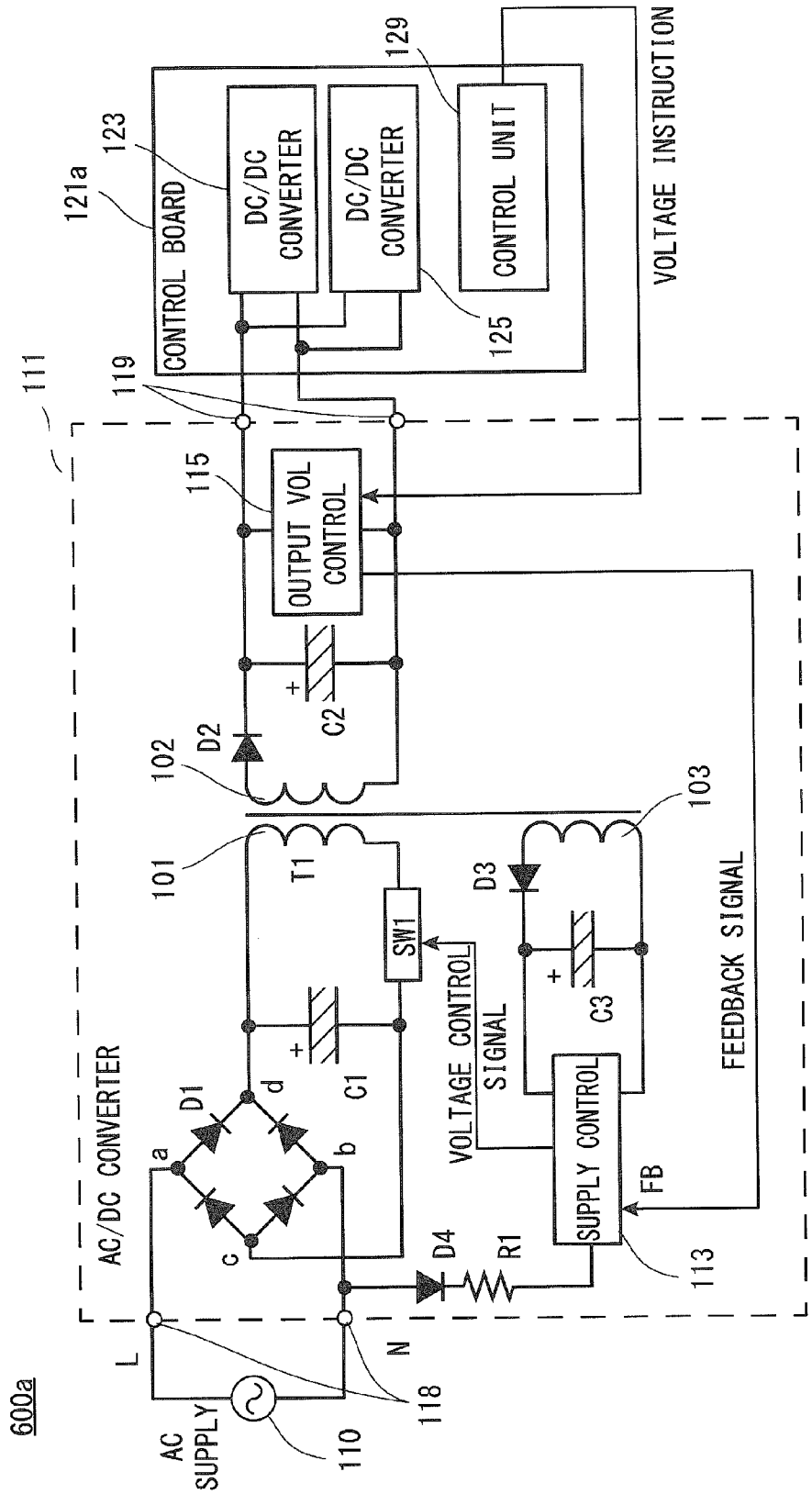
FIG. 11 is a circuit diagram showing a structure of the electric power supply device, according to the second embodiment of this invention.

FIG. 11 is a circuit diagram showing a structure of electric power supply device 600a according to the second embodiment of this invention.

As shown in FIG. 11, control unit 129 is provided in control circuit board 121a of electric power supply device 600a. Control unit 129 outputs electrical voltage instructions to outputting electrical voltage control unit 115, based on outputting electrical voltage of AC/DC converter 111.

Load electrical currents of electric power supply device 600a for behavior modes of image forming apparatus 1 are beforehand identified respectively. Hence, outputting electrical voltage of AC/DC converter 111 (more specifically, input electrical voltage of DC/DC converters 123, 125) when DC/DC converters 123, 125 perform intermittent oscillation can be beforehand determined According to the second embodiment, control unit 129 outputs electrical voltage instructions to outputting electrical voltage control unit 115, based on the outputting electrical voltage determined by such the way. Outputting electrical voltage control unit 115 works in response to the behavior mode of image forming apparatus 1, based on the electrical voltage instruction. Hence, outputting electrical voltage of AC/DC converter 111 is adjusted. More specifically, an electrical voltage control unit (an example of an electrical voltage control means) is configured with control unit 129 and outputting electrical voltage control unit 115.

Figure 12:
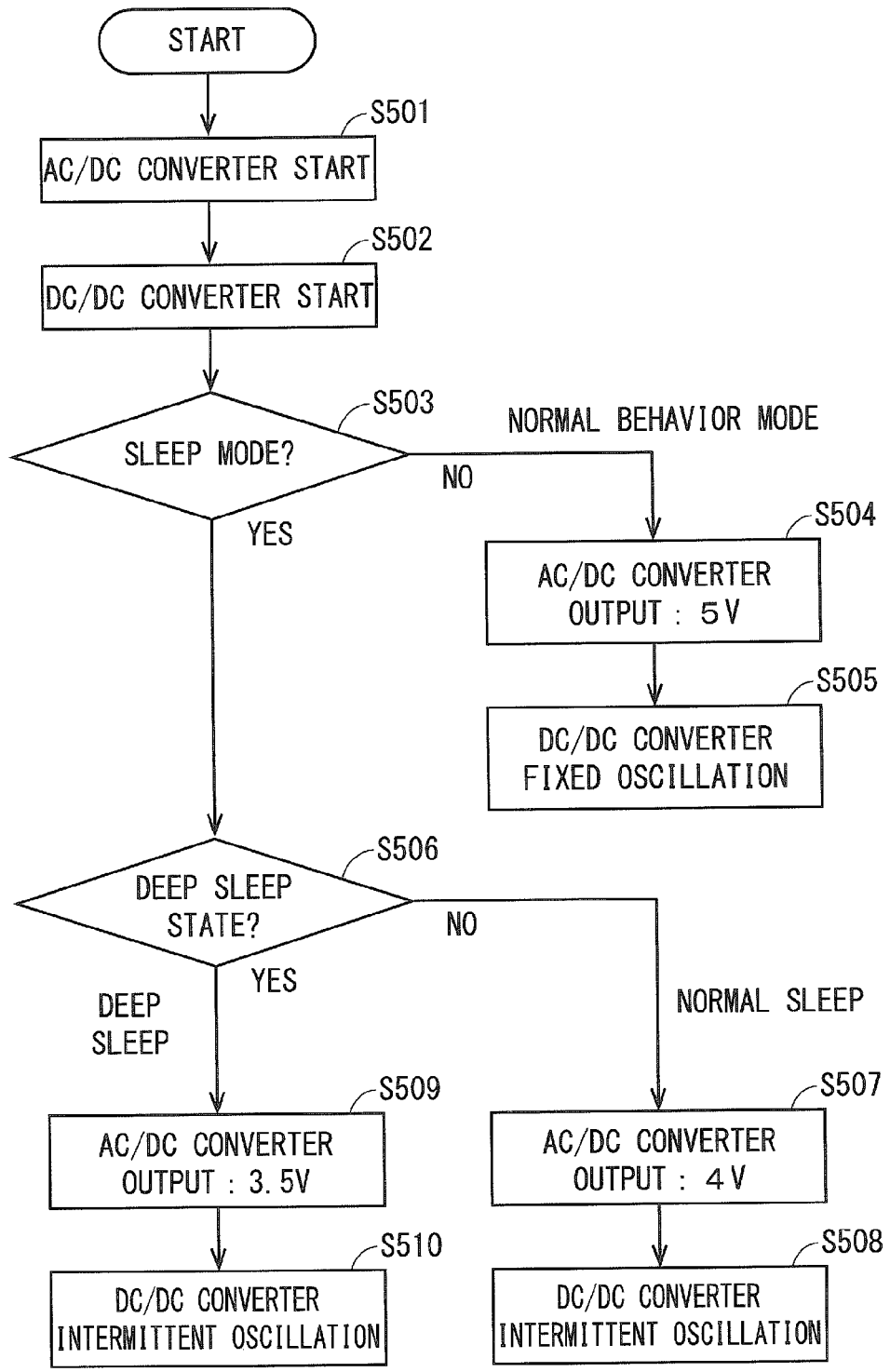
FIG. 12 is a flowchart showing behavior of the electric power supply device.

FIG. 12 is a flowchart showing behavior of electric power supply device 600a.

As shown in FIG. 12, AC/DC converter 111 starts up at step S501. Then, DC/DC converters 123, 125 start up at step S502.

At step S503, outputting electrical voltage control unit 115 determines whether the behavior mode of image forming apparatus 1 is a sleep mode or not.

When the behavior mode of image forming apparatus 1 is not a sleep mode at step S503 (when the behavior mode is a normal behavior mode), outputting electrical voltage of AC/DC converter 111 is adjusted at step S504, so that the outputting electrical voltage is fixed at 5V. Namely, control unit 129 outputs an electrical voltage instruction. The adjustment is based on the instruction.

At step S505, in the state that output of AC/DC converter 111 is 5V, DC/DC converters 123, 125 perform fixed oscillation. Herewith, electric power by which image forming apparatus 1 works in a normal behavior mode is supplied.

On the other hand, when the mode is a sleep mode at step S503, whether image forming apparatus 1 is in a so-called deep sleep state or not is determined at step S506. In the deep sleep state, the type and amount of processes being executed are more restricted than behavior in the normal sleep mode, for example. Then, load electrical current is small in the deep sleep state.

When the state is not the deep sleep state at step S506 (when a normal sleep state), outputting electrical voltage of AC/DC converter 111 is adjusted so that the outputting electrical voltage is fixed at 4V at step S507. Control unit 129 outputs electrical voltage instruction. The adjustment is done based on the instruction. At step S508, in the state that output of AC/DC converter 111 is 4V, DC/DC converters 123, 125 perform intermittent oscillation. Herewith, by working in a sleep mode, energy-saving effect can be achieved.

On the other hand, when the state is the deep sleep state at step S506, outputting electrical voltage of AC/DC converter 111 is adjusted so that the outputting electrical voltage is fixed at 3.5V at step S509. Control unit 129 outputs electrical voltage instruction. The adjustment is done based on the instruction.

At step S510, in the state that output of AC/DC converter 111 is 3.5V, DC/DC converters 123, 125 perform intermittent oscillation. Herewith, more effective energy-saving than a normal sleep state can be performed.

In a sleep mode behavior, the outputting electrical voltage value of AC/DC converter 111 is controlled, based on the electrical voltage instruction from control unit 129 and a table, for example. The table shows the relationship between load electrical current of DC/DC converters 123, 125 and outputting electrical voltage.

Figure 13:
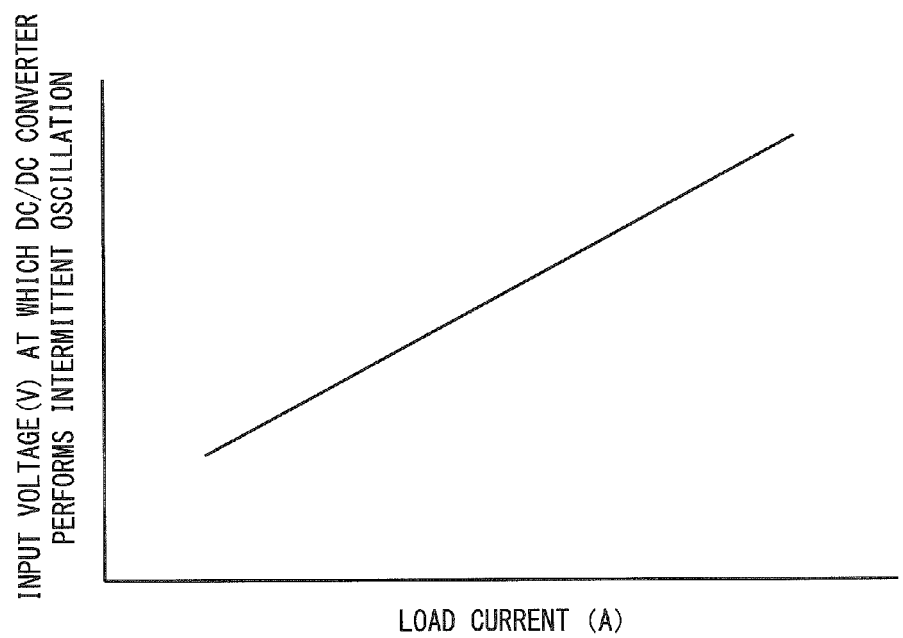
FIG. 13 shows a relationship between the input electrical voltage and the load electrical current for intermittent oscillation of the DC/DC converter.

FIG. 13 shows the relationship between the input electrical voltage and the load electrical current for intermittent oscillation of the DC/DC converter 123, 125.

In FIG. 13, the horizontal axis shows the load electrical current of electric power supply device 600a. The vertical axis shows the input electrical voltage of DC/DC converters 123, 125 when DC/DC converters 123, 125 can perform intermittent oscillation.

As shown in FIG. 13, input electrical voltages at which DC/DC converters 123, 125 perform intermittent oscillation in response to the load electrical current are beforehand known. The relationship between the load electrical current and input electrical voltage at which intermittent oscillation is performed is almost proportional relation, for example. Then, the average value of electrical currents IDC of DC/DC converters 123, 125 is measured. Control unit 129 controls outputting electrical voltage of AC/DC converter 111, so that the voltage is corresponding to the load electrical current. Hence, the intermittent oscillation state can be maintained at all times. When the load electrical current changes, the intermittent oscillation state or the frequency declined oscillation state is maintained. Therefore, high efficiency DC/DC converters 123, 125 can be achieved.

Control unit 129 may output electrical voltage instructions based on the table which shows the relationship among behavior modes of image forming apparatus 1, install situations of optional devices for image forming apparatus 1, and input electrical voltages of DC/DC converters 123, 125. For example, when an expansion memory which is an optional device is loaded on image forming apparatus 1, outputting electrical voltage of AC/DC converter 111 may be controlled so that the voltage in a predetermined behavior mode (for example, a sleep mode) is higher than when the expansion memory is not loaded.

[Others]

The outputting electrical voltage control unit may be in an AC/DC converter or a control circuit board, or be installed in another board.

A DC/DC converter may be used as substitute for the AC/DC converter above. The image forming apparatus may be a black-and-white/color copying machine, a printer, a facsimile device, a multifunction machine (MFP), or the like. The image forming apparatus is not restricted to an apparatus forming images by electrophotographic technology. The image forming apparatus may form images by a so-called ink jet system, for example.

The hardware configuration of an image forming apparatus is not restricted to the above. Processes such as image processing may be performed by various sorts of control circuits.

The processes of above embodiments may be performed by software or a hardware circuit.

A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet. The processes explained in the above flowcharts and the description are executed by a CPU in line with the program.

This invention is not restricted for an image forming apparatus. This invention is applicable to other kinds of devices or the electric power supply device used for the devices widely.

According to the embodiments, the outputting electrical voltage is controlled in response to the behavior state of the second converters, so that at least one of the second converters performs the low electric power behavior. Hence, an electric power supply control device, an image forming apparatus, a control method of an electric power supply control device, and a control program for an electric power supply control device which are able to achieve a high electric power converting efficiency can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric power supply control device comprising:
   a first converter for performing converting behavior to convert input electrical current and output direct electric current;
   at least one second converter being connected with the first converter in series, which can work in intermittent oscillation method, and performs converting behavior to output direct electric current voltage by converting outputting electrical voltage being output from the first converter; and
   an electrical voltage control unit for controlling the outputting electrical voltage being output from the first converter; wherein
   the second converter is configured to perform low electric power behavior under certain circumstances, in which a switching frequency of oscillation being performed is lower than other circumstances or intermittent oscillation is performed; and
   the electrical voltage control unit controls the outputting electrical voltage, so that
      the outputting electrical voltage is equal to or less than a minimum value of upper limits of operating electrical voltage of the second converter, and is more than or equal to a maximum value of lower limits of operating electrical voltage of the second converter, and
      at least one of the second converter performs the low electric power behavior in response to a behavior state of the second converter.

2. The electric power supply control device according to claim 1, wherein
   the electrical voltage control unit controls the outputting electrical voltage, based on behavior modes of an equipment which uses electric power being output from the second converter.

3. The electric power supply control device according to claim 2, wherein
   the behavior modes include at least a sleep mode and a behavior mode other than the sleep mode;
   the electrical voltage control unit controls the outputting electrical voltage, so that the outputting electrical voltage is a predetermined electrical voltage value, when the equipment which uses electric power being output from the second converter works in the behavior mode other than the sleep mode.

4. The electric power supply control device according to claim 1, wherein
   the electrical voltage control unit controls the electrical voltage value, based on a table which shows a relationship between a load electrical current of the second converter and the outputting electrical voltage.

5. The electric power supply control device according to claim 1, wherein
   the electrical voltage control unit controls the electrical voltage value, based on a table which shows a relationship among a behavior mode of an equipment which uses electric power being output from the second converter, install situations of optional devices, and input electrical voltage of the second converter.

6. The electric power supply control device according to claim 1, wherein the electrical voltage control unit includes:
   a detecting unit for detecting that the second converter is performing the low electric power behavior;
   an electrical voltage increase unit for increasing the outputting electrical voltage little by little, from a lower limit of operating electrical voltage of the second converter;
   a stop unit for stopping increasing behavior of the outputting electrical voltage in case that the detecting unit detects that the second converter is performing the low electric power behavior when the electrical voltage increase unit is increasing the outputting electrical voltage; and an electrical voltage setting unit for controlling the outputting electrical voltage, so that the outputting electrical voltage is the lower limit, in case that the detecting unit does not detect the low electric power behavior, even though the outputting electrical voltage increases to an upper limit of operating electrical voltage of the second converter, when the electrical voltage increase unit increased the outputting electrical voltage.

7. The electric power supply control device according to claim 6, wherein the detecting unit detects that the second converter is performing the low electric power behavior, based on at least one of a reactor electrical current of the second converter, a control amplifier output, and a duty ratio of a PWM signal for controlling switching behavior.

8. An image forming apparatus comprising:

the electric power supply control device according to claim 1; wherein the second converter of the electric power supply control device provides electric power to the image forming apparatus, and the image forming apparatus works.

9. A method of controlling an electric power supply control device, wherein the electric power supply control device comprising:

a first converter for performing converting behavior to convert input electrical current and output direct electric current; and at least one second converter being connected with the first converter in series, which can work in intermittent oscillation method, and performs converting behavior to output direct electric current voltage by converting outputting electrical voltage being output from the first converter; wherein the second converter is configured to perform low electric power behavior under certain circumstances, in which a switching frequency of oscillation being performed is lower than other circumstances or intermittent oscillation is performed; wherein the method of controlling an electric power supply control device is configured to:

acquire information which relates to a behavior state of the second converter; and control the outputting electrical voltage being output from the first converter, so that at least one of the second converter performs the low electric power behavior, in response to the acquired information; wherein the outputting electrical voltage is controlled, so that the outputting electrical voltage is equal to or less than a minimum value of upper limits of operating electrical voltage of the second converter, and is more than or equal to a maximum value of lower limits of operating electrical voltage of the second converter.

10. The method of controlling an electric power supply control device according to claim 9, wherein the outputting electrical voltage is controlled, based on behavior modes of an equipment which uses electric power being output from the second converter.

11. The method of controlling an electric power supply control device according to claim 9, wherein the electrical voltage value is controlled, based on a table which shows a relationship between a load electrical current of the second converter and the outputting electrical voltage.

12. The method of controlling an electric power supply control device according to claim 9, wherein the electrical voltage value is controlled, based on a table which shows a relationship among a behavior mode of an equipment which uses electric power being output from the second converter, install situations of optional devices, and input electrical voltage of the second converter.

13. The method of controlling an electric power supply control device according to claim 9, wherein the method is configured to:

detect that the second converter is performing the low electric power behavior;

increase the outputting electrical voltage little by little, from a lower limit of operating electrical voltage of the second converter;

stop increasing behavior of the outputting electrical voltage in case that the second converter is performing the low electric power behavior when increasing the outputting electrical voltage; and control the outputting electrical voltage, so that the outputting electrical voltage is the lower limit, in case that the low electric power behavior was not detected, even though the outputting electrical voltage increases to an upper limit of operating electrical voltage of the second converter, when the outputting electrical voltage increased.

14. A non-transitory computer-readable recording medium storing a controlling program for an electric power supply control device, wherein the electric power supply control device comprising:

a first converter for performing converting behavior to convert input electrical current and output direct electric current; and at least one second converter being connected with the first converter in series, which can work in intermittent oscillation method, and performs converting behavior to output direct electric current voltage by converting outputting electrical voltage being output from the first converter; wherein the second converter is configured to perform low electric power behavior under certain circumstances, in which a switching frequency of oscillation being performed is lower than other circumstances or intermittent oscillation is performed; wherein the program causing a computer to execute the steps of:

acquire information which relates to a behavior state of the second converter; and control the outputting electrical voltage being output from the first converter, so that at least one of the second converter performs the low electric power behavior, in response to the acquired information; wherein the outputting electrical voltage is controlled, so that the outputting electrical voltage is equal to or less than a minimum value of upper limits of operating electrical voltage of the second converter, and is more than or equal to a maximum value of lower limits of operating electrical voltage of the second converter.

15. The non-transitory computer-readable recording medium storing a controlling program for an electric power supply control device according to claim 14, wherein the outputting electrical voltage is controlled, based on behavior modes of an equipment which uses electric power being output from the second converter.

16. The non-transitory computer-readable recording medium storing a controlling program for an electric power supply control device according to claim 14, wherein the electrical voltage value is controlled, based on a table which shows a relationship between a load electrical current of the second converter and the outputting electrical voltage.

17. The non-transitory computer-readable recording medium storing a controlling program for an electric power supply control device according to claim 14, wherein
the electrical voltage value is controlled, based on a table which shows a relationship among a behavior mode of an equipment which uses electric power being output from the second converter, install situations of optional devices, and input electrical voltage of the second converter.

18. The non-transitory computer-readable recording medium storing a controlling program for an electric power supply control device according to claim 14, wherein the program is configured to:
detect that the second converter is performing the low electric power behavior;
increase the outputting electrical voltage little by little, from a lower limit of operating electrical voltage of the second converter;
stop increasing behavior of the outputting electrical voltage in case that the second converter is performing the low electric power behavior when increasing the outputting electrical voltage; and
control the outputting electrical voltage, so that the outputting electrical voltage is the lower limit, in case that the low electric power behavior was not detected, even though the outputting electrical voltage increases to an upper limit of operating electrical voltage of the second converter, when the outputting electrical voltage increased.

* * * * *